(12) United States Patent
Sjölén (10) Patent No.: US 11,320,343 B2
(45) Date of Patent: May 3, 2022

(54) DEVICE FOR SURFACE SAMPLING

(71) Applicant: Expertus Kemiteknik AB, Sundsvall (SE)

(72) Inventor: Lennart Sjölén, Sundsvall (SE)

(73) Assignee: EXPERTUS KEMITEKNIK AB, Sundsvall (SE)

( * ) Notice: Subject to any disclaimer, the term of this patent is extended or adjusted under 35 U.S.C. 154(b) by 0 days.

(21) Appl. No.: 17/086,490

(22) Filed: Nov. 2, 2020

(65) Prior Publication Data

US 2021/0080356 A1 Mar. 18, 2021

Related U.S. Application Data

(60) Division of application No. 15/273,949, filed on Sep. 23, 2016, now abandoned, which is a continuation of application No. PCT/SE2015/050334, filed on Mar. 20, 2015.

(30) Foreign Application Priority Data

Mar. 24, 2014 (SE) .................................. 1450338-7

(51) Int. Cl.
*G01N 1/02* (2006.01)
*G01N 1/10* (2006.01)

(52) U.S. Cl.
CPC ............. *G01N 1/02* (2013.01); *G01N 1/10* (2013.01); *G01N 2001/028* (2013.01); *G01N 2001/1056* (2013.01)

(58) Field of Classification Search
CPC ...... G01N 1/02; G01N 1/10; G01N 2001/028; G01N 2001/1056
See application file for complete search history.

(56) References Cited

U.S. PATENT DOCUMENTS

| | | | | |
|---|---|---|---|---|
| 5,088,502 A | * | 2/1992 | Miller | A61B 10/02 600/572 |
| 5,910,450 A | * | 6/1999 | Manns | G01N 1/405 436/181 |
| 6,425,997 B1 | * | 7/2002 | Johnson | C25F 1/00 205/705 |
| 6,925,896 B1 | * | 8/2005 | Morton | G01N 1/02 15/215 |
| 10,996,143 B2 | * | 5/2021 | Sjolen | B65D 65/22 |
| 2008/0188387 A1 | * | 8/2008 | Horsewood | G01N 1/30 510/130 |
| 2017/0074754 A1 | * | 3/2017 | Sjolen | G01N 1/02 |

FOREIGN PATENT DOCUMENTS

| | | | | |
|---|---|---|---|---|
| EP | 2395338 A1 | * | 12/2011 | ......... A61B 10/0096 |
| JP | 2011502546 A | * | 1/2011 | ............ C12M 41/36 |

\* cited by examiner

*Primary Examiner* — Herbert K Roberts
(74) *Attorney, Agent, or Firm* — Gabriela B. Tomescu, Esq.; Bergenstråhle & Partners AB (57) ABSTRACT

Device for surface sampling, comprising: a flat material layer comprising a surface portion and a circumferential edge portion defining the boundary of the surface portion, further comprising a sampling volume, wherein the sampling volume is adapted to comprise a filler device for filling out the sampling volume, a protective layer arranged on the surface portion of the material layer by an adhesive arranged on the material layer, wherein a portion of the protective layer extends beyond the boundary of the surface portion for facilitating a removal of the protective layer from the material layer.

5 Claims, 9 Drawing Sheets

DEVICE FOR SURFACE SAMPLING

This application is a divisional of U.S. patent application Ser. No. 15/273,949, filed on Sep. 23, 2016, which is the continuation of International Application No. PCT/SE2015/050334, filed 20 Mar. 2015, which claims the benefit of Swedish Patent Application No. SE 1450338-7, filed 24 Mar. 2014, the entire contents of which are hereby incorporated by reference.

TECHNICAL FIELD

The present invention relates generally to devices for surface sampling.

BACKGROUND ART

It is known to use adhesive patches for surface sampling comprising a protective sheet to be removed prior to attaching the patch to a surface.

A drawback with the known art is that difficulties arise when trying to remove the protective sheet of the adhesive patch in order to expose the adhesive surface of the adhesive patch prior to use. It is often a time consuming and cumbersome procedure which is made even more difficult if the person carrying out the task is wearing protective gloves as is often the case. Further, this procedure increases the risk of unwanted contact to the adhesive surface of the adhesive patch, leaving dirt on the adhesive surface as well as unwanted removal of adhesive, whereby the adhesive ability of the device is reduced. Certain requirements have to be met according to a test described in the relevant ISO-Standard in this technical field in terms of withstanding the increased pressure resulting from filling the sampling compartment without leakage occurring. As a result, the adhesive patch may be hard to use in certain conditions or on certain surfaces and shapes of surfaces, as the adhesive patch may fall off or allow air or dirt to enter from the outside causing contamination of the sampling compartment.

Many tests or samples are made in industrial environments for example in the ship building industry, wherein the surfaces to be analyzed are difficult and dangerous to reach, for instance vertical ship sides or walls or roofs in ballast tanks or standing on unsafe scaffolds or ladders with falling risks present. To reduce the risk an operator needs to have focus on the work position being secured in a manner preventing a fall, for instance by holding on suitable objects. Further, the work related to surface sampling may be made in areas of very limited lighting conditions. Any additional, unwanted time and extra focus required to prepare the adhesive patch generated by removing the protective sheet increases the exposure to this risk.

Another drawback during the use of the adhesive patches of the known art is the risk of contaminating the sampling compartment or volume with unwanted/foreign contaminants unrelated to surface to be sampled, as a result of existing ways of manually removing the filler device from the sampling volume prior to use. This risk is especially high in the environment wherein these adhesive patches are commonly used for sampling, i.e. in industrial environments which can be dusty or filled with residues from blasting sand previously used on a surface to be painted which cleanliness is tested using the sample prior to painting. This may cause the result of the sampling to be erroneous.

SUMMARY OF INVENTION

An object of the present invention is to create a device for surface sampling which is easier, less time-consuming and therefore both more economic and safer to use.

Another object of the present invention is to create a device for surface sampling wherein device more reliably sticks to a given surface.

Another object is to create a device for surface sampling which reduces the risk of contamination in the sampling volume.

According to one embodiment, a device for surface sampling is provided, comprising:
a flat material layer comprising a surface portion and a circumferential edge portion defining the boundary of the surface portion, further comprising a sampling volume, wherein the sampling volume is adapted to comprise a filler device for filling out the sampling volume,
a protective layer arranged on the surface portion of the material layer by an adhesive arranged on the material layer, wherein a portion of the protective layer extends beyond the boundary of the surface portion for facilitating a removal of the protective layer from the material layer.

According to another embodiment, a device for surface sampling is provided, comprising:
a flat material layer comprising a surface portion and a circumferential edge portion defining the boundary of the surface portion, further comprising a sampling volume, wherein the sampling volume is adapted to comprise a filler device of the material for filling out the sampling volume,
a protective layer arranged on the surface portion of the material layer by an adhesive arranged on the material layer, wherein a gripping device is arranged between the protective layer and the material layer comprising a portion extending beyond the boundary of the surface portion for facilitating a removal of the protective layer from the flat material layer.

According to another embodiment, the gripping device is attached to the underside of the protective layer using an adhesive.

According to another embodiment, the gripping device is further attached to the upper side of the protective layer using an adhesive.

According to another embodiment, the gripping device is a thin thread.

According to another embodiment, the gripping device is a flat elongated sheet device.

According to another embodiment, the gripping device comprises a silicone treated portion.

According to another embodiment, the entire gripping device is silicone treated.

According to another embodiment, the gripping device comprises a portion non-treated with silicon.

According to another embodiment, at least a portion of the silicon treated portion extends beyond the boundary of the material.

According to another embodiment, the gripping device extends beyond the boundary of the material layer on two sides.

According to another embodiment, a filler device is arranged in the sampling volume.

According to another embodiment, the portion of the gripping device, non-treated with silicon, is attached to the filler device by the adhesive.

According to another embodiment, a device for surface sampling is provided, comprising:
a flat material layer comprising a surface portion and a circumferential edge portion defining the boundary of the surface portion, further comprising a sampling volume, wherein the sampling volume is adapted to comprise a filler device of the material for filling out the sampling volume,
a protective layer arranged on the surface portion of the material layer by an adhesive arranged on the material layer, wherein a gripping device is attached to an upper side of the protective layer comprising a portion extending beyond the boundary of the surface portion for facilitating a removal of the protective layer from the flat material layer.

According to another embodiment, a device for surface sampling is provided, comprising:
a flat material layer comprising a surface portion and a circumferential edge portion defining the boundary of the surface portion, further comprising a sampling volume, wherein the sampling volume is adapted to comprise a filler device of the material for filling out the sampling volume,
a protective layer arranged on the surface portion of the material layer by an adhesive arranged on the material layer, wherein a gripping device comprising one portion attached to an upper side of the protective layer comprising a further portion extending entirely within the boundary of the surface portion for facilitating a removal of the protective layer from the flat material layer.

According to another embodiment, a device for surface sampling is provided, wherein the device is configured for being fixed to a test surface, and for allowing washing/extracting liquid to be injected and extracted from the device while being fixed to the test surface, the device comprising:
a flat material layer comprising a surface portion and a circumferential edge portion defining the boundary of the surface portion, further comprising a sampling volume, wherein the sampling volume is adapted to comprise a filler device for filling out the sampling volume,
a protective layer arranged on the surface portion of the material layer by an adhesive arranged on the material layer, characterized in that a portion of the protective layer extends beyond the boundary of the surface portion for facilitating a removal of the protective layer from the material layer.

According to one embodiment, a method of manufacturing a device as described e.g. in [009]-[0024] above is provided, the method comprising:
  feeding an elongated material layer, and a protective layer and latex sheet or thin elastomer film arranged on a respective side of the material layer,
  forming a circumferential edge portion of the of the material layer by punching through the latex sheet or thin elastomer film and the material layer using a punch for forming a circumferential edge portion of the of the material layer,
  forming a portion of the protective layer by punching through the latex sheet or thin elastomer film, the material layer and the protective layer using a further punch for forming a portion, whereby the punching, or at least part of the punching, is carried out outside the circumferential edge portion.

According to one embodiment, forming of the sampling volume is carried out using a first punch and adding a latex sheet or thin elastomer film is carried out before using the punch for forming the circumferential edge portion.

According to one embodiment, punching using the punch for forming the circumferential edge portion, forms at least punching lines $2d_1$ and $2d_2$ having a first distance there between, and wherein the punching using punch for forming the portion $3a$, forms at least punching lines $3a_1$ and $3a_2$ having a second distance there between, wherein the second distance is larger than the first distance at least where the portion $3a$ is formed.

According to one embodiment, forming the portion $3a$ is carried out by punching through latex sheet or thin elastomer film 9, the material layer 2 in addition to the protective layer 3.

BRIEF DESCRIPTION OF DRAWINGS

The invention is now described, by way of example, with reference to the accompanying drawings, in which:

FIG. 2a" shows a side view of a gripping device.

FIGS. 2a'-2d' shows perspective views of a device for surface sampling according to FIGS. 2a-2d, wherein the interior of the device for surface sampling is disclosed.

DESCRIPTION OF EMBODIMENTS

In the following, a detailed description of the invention will be given. In the drawing figures, like reference numerals designate identical or corresponding elements throughout the several figures. It will be appreciated that these figures are for illustration only and are not in any way restricting the scope of the invention. According to one embodiment, flat or planar should be understood as something essentially extending in two dimensions. This should not be understood as not having any extension in the third dimension. According to one embodiment, planar or flat is defined as wherein a thickness or height dimension of the device 1 is less than any of the extensions of the device 1, perpendicular to the thickness or height direction, defining the surface area of the device 1. According to one embodiment, the use of underside and upper side throughout the text are used for explanatory purposes only. The use of the device 1 enables it to be attached to surfaces having arbitrary normal directions in the three-dimensional space, wherein these surfaces or normal direction of these surfaces may basically have any direction.

Figure 1:
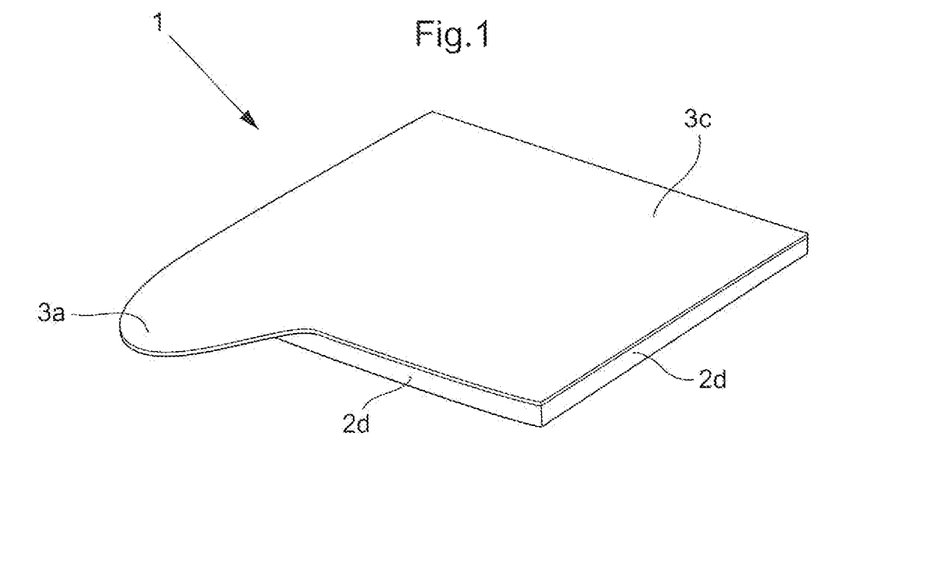
FIGS. 1-1' shows a perspective view of a device for surface sampling according to one embodiment of the invention.

FIGS. 1-1' shows a perspective view of a device 1 for surface sampling, i.e. whereby a surface can be tested by the aid of chemical analysis, for instance by checking for existing contaminants, substances or particles in the test surface area. FIG. 1 shows the device 1 in a closed state prior to usage and FIG. 1' shows the interior of the device 1.

The device 1 for surface sampling comprises a flat or planar material layer 2 comprising a surface portion 2c and a circumferential edge portion 2d encompassing the surface portion 2c and thus defining a boundary of the surface portion 2c. According to one embodiment, the material layer 2 comprises a foam material. According to one embodiment, the material layer is made of ageing—resistant, flexible material with closed pores, e.g. polyethylene foam. According to one embodiment, the foam material is a double-stick foam material. According to one embodiment, adhesive is arranged on the underside and on the upper side of the material layer 2, wherein a protective sheet 8 is present on the underside and removed to be replaced by a latex sheet 9 or thin elastomer film 9, in a manufacturing step. According to one embodiment, the flat material layer 2 comprises several layers of double-stick foam are arranged onto each other. According to one embodiment, the flat material layer 2 has a depth of between 1-5 mm. According to one embodiment, the device 1 may have a square shape. According to one embodiment, the device 1 may have a rectangular shape. According to another embodiment, the device 1 may have a circular shape. The device 1 may thus have various forms, shapes and dimensions. According to one embodiment, the dimensions/size of the device 1 is a 5×5 cm shaped square. According to one embodiment, the material layer 2 has a thickness of 1-5 mm.

The device 1 for surface sampling further comprises a sampling volume 2a. According to one embodiment, the sampling volume 2a is adapted to comprise a filler device 2b, which essentially fills out the sampling volume 2a prior to use and forms a reinforcement until the device is used. Before use of the device 1, the filler device 2b may be removed from the sampling volume 2a, thus creating a recess in the surface portion 2c. According to one embodiment, the filler device 2b is a cut-out of the material 2a. According to one embodiment, the cut-out of the material is created during manufacturing of the device 1 in a punching process step. According to one embodiment, the filler device 2b is a separate material compared to the material layer 2. According to one embodiment, the filler device has a round or circular shape. According to one embodiment, the corresponding sampling area of the sampling volume 2a is 12.5 cm$^2$. According to one embodiment, the sampling volume has a depth of 1-2 mm. According to one embodiment, the filler device 2b may have various forms, shapes and dimensions to fit various needs. The filler device 2b may for instance be square circular, rectangular, elliptical etc.

The device 1 for surface sampling further comprises a protective layer 3 arranged on the surface portion 2c of the material layer 2 by an adhesive 4 arranged on the material layer 2. According to one embodiment, the adhesive 4 is an adhesive layer covering the surface portion 2c. According to one embodiment, the protective layer 3 is a thin sheet of paper. According to one embodiment, the protective layer 3 is treated, at least on one side preferably the underside 3b, with silicon or other suitable substances or material to more easily be detachable from the adhesive and the material layer 2. According to one embodiment, the protective layer 3 is a siliconized sheet of paper.

According to one embodiment of the device 1, for surface sampling, as shown in FIGS. 1-1', a portion 3a of the protective layer 3 extends beyond the boundary of the surface portion 2c for facilitating a removal of the protective layer 3 from the material layer 2. A person aiming to remove the protection layer may more easily grasp the portion 3a extending beyond the surface portion 2a and pull off the protective layer 3 from the material layer 2. According to one embodiment, the shape of the portion 3a may be rounded as in FIG. 1 or have other geometrical shapes, and extend beyond the boundary of the surface portion 2c to a varying extent. According to one embodiment, the portion 3a extends by 1%-50% of the total length or diameter of the device 1, beyond the boundary of the surface portion 2c, in the same or a parallel direction as the extension of the portion 3a. According to one embodiment, the portion 3a extends by 0.5-25 mm beyond the boundary of the surface portion 2c. According to one embodiment, the largest extension of the portion 3a in a direction opposite to the extension beyond the boundary is between 10%-100% of the length of the device 1 in a direction parallel to the extension in this direction. According to one embodiment, a certain portion of the protective layer 3 directly above the filler device 2b may not be siliconized or treated by any other means to more easily detach from the adhesive. Therefore when a user pulls the portion 3a the protective layer 3 will be removed to expose the adhesive 4 prior to attaching the device 1 for sampling, and at the same time remove the filler device 2b from the sampling volume 2a which will thus stick to the protective layer 3. Thus, no direct contact of a human to the filler or sampling volume 2a is needed during removal for the filler device 2b which reduces the risk of contaminating the sampling volume 2a.

Figure 2A:
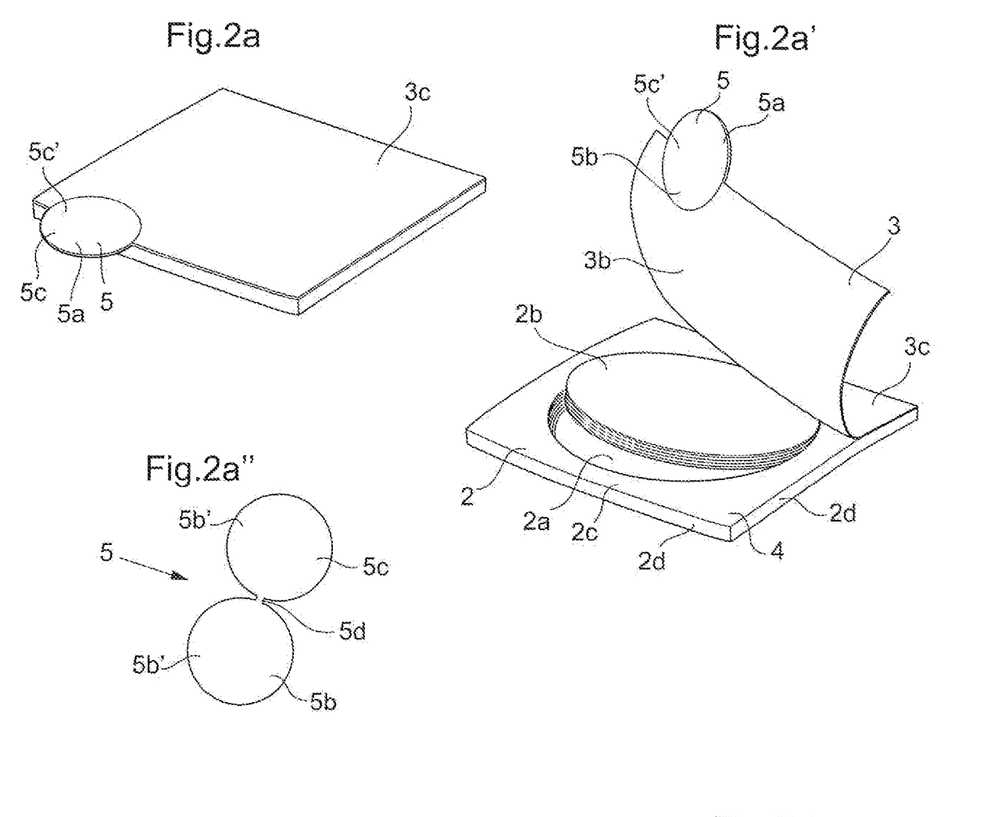
FIGS. 2a-2d shows a perspective view of a device for surface sampling according to one embodiment of the invention.
Figure 2B:
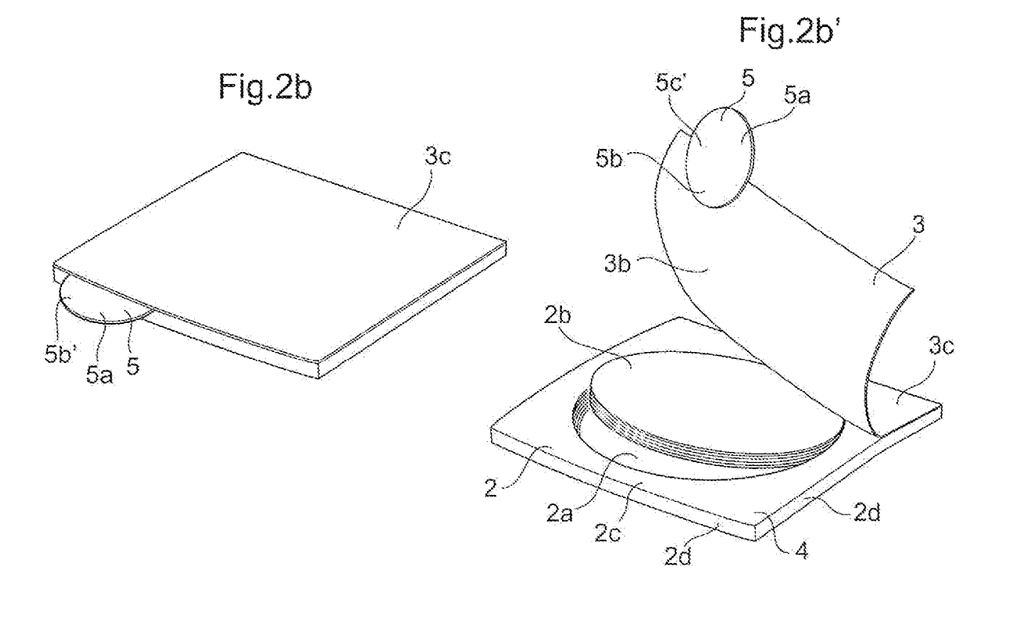
Figure 7:
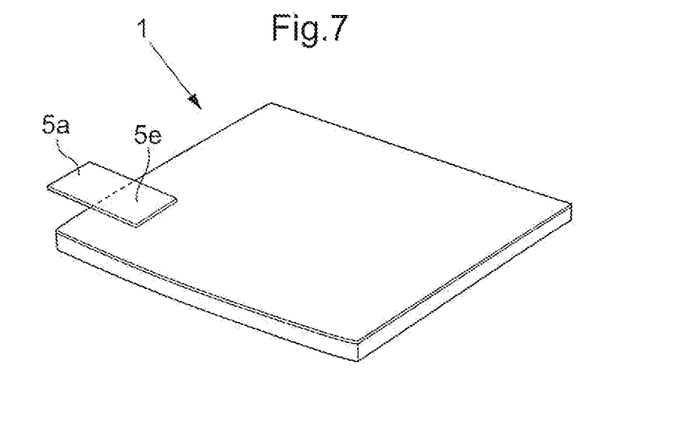
FIG. 7 shows a perspective view of a device for surface sampling.
Figure 8A:
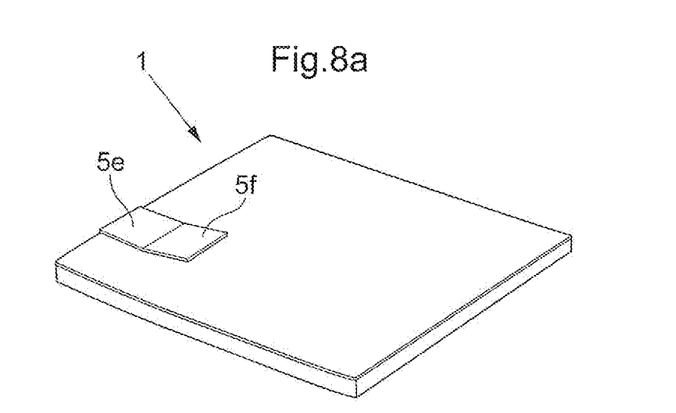
FIGS. 8a-8b show perspective views of a device for surface sampling.
Figure 8B:
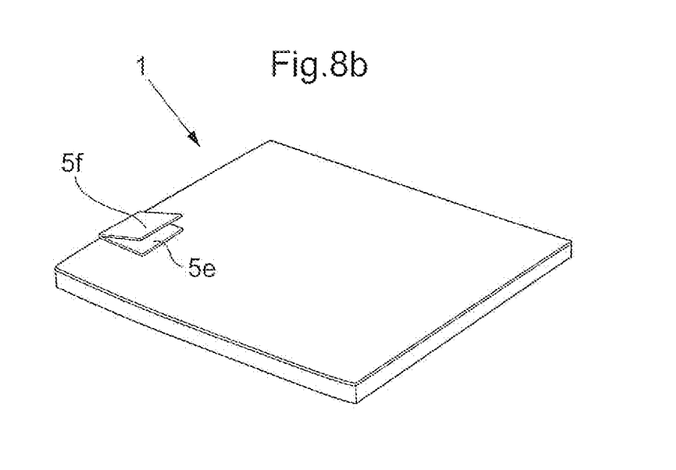

FIGS. 2a-2d, and FIGS. 2a'-2d' discloses a device 1 for surface sampling according to the embodiment of FIG. 1 except for the portion 3a. FIGS. 2a-2d, and FIGS. 2a'-2d' further discloses a device 1 wherein a gripping device 5 of various respective shapes are arranged between the protective layer 3 and the material layer 2 comprising a portion 5a, 6a extending beyond the boundary of the surface portion 2c for facilitating a removal of the protective layer 3 from the material layer 2. According to one embodiment, the gripping device 5 is attached to the underside 3b of the protective layer 3 using an adhesive. According to one embodiment, the length of the portion 5a, 6a extending beyond the boundary of the surface portion 2c is 5% to 50% of the total length of the protective layer 3. According to one embodiment, the length of the portion 5a, 6a extending beyond the boundary of the surface portion 2c is less than the length of the portion attached to the underside 3b of the protective layer 3. According to one embodiment, the length of the portion 5a, 6a extending beyond the boundary of the surface portion 2c is less than a third of the total length of the protective layer 3. According to one embodiment, the gripping device 5 comprises a sheet having an upper side 5c' and an underside 5b' wherein an adhesive is arranged on the underside 5b' of the gripping device 5/sheet. According to one embodiment as is seen in FIGS. 2a'-2d', the gripping device 5 is further attached to the upper side 3c of the protective layer 3 using the adhesive on the underside 5b' of the gripping device 5, wherein the gripping device 5 is bent via a material bridge 5d of the gripping device 5 as seen in FIG. 2a", wherein the material bridge 5d connects an upper portion 5c and a lower portion 5b of the gripping device 5. According to one embodiment, two separate gripping devices 5 are simply adhered to each other at their under sides 5b' and a respective side of the protective layer 3 is arranged in between the two gripping devices 5. According to one embodiment, the gripping device 5 is solely arranged and attached to the upper side 3c of the protective layer 3 at portion 5e, using an adhesive, comprising a portion 5a extending beyond the boundary of the surface portion (2c) for facilitating a removal of the protective layer (3) from the flat material layer (2). This embodiment can be seen in FIG. 7. According to one embodiment, the gripping device 5 is attached to the upper side 3c of the protective layer 3 comprising a portion 5a essentially extending in a direction non-parallel to the surface portion (2c) for facilitating a removal of the protective layer (3) from the flat material layer (2). Therefore, the portion 5a will extend in a direction non-parallel to the surface of the upper side 3c of the protective layer 3. According to one embodiment, no portion of the gripping device 5*a* extends beyond the boundary of the surface portion 2*c*. According to one embodiment, the gripping device 5 may first be arranged to extend beyond the boundary of the surface portion 2*c* and then angled, folded or bent to extend above the surface portion 2*c* or upper side of the protective layer 3. According to one embodiment, a gripping device (5, 6) comprising one portion 5*e* attached to the upper side 3*c* of the protective layer (3) comprising a further portion 5*f* is extending entirely within the boundary of the surface portion 2*c* for facilitating a removal of the protective layer (3) from the flat material layer 2. This further portion 5*f* may not be attached to the upper side of the protective layer 3. According to one embodiment, which can be seen in FIG. 8*a* this further portion 5*f* essentially rests parallel to the surface portion 2*c* and upper side 3*c* of the protective layer 3. According to one embodiment, the gripping device 5 may first be arranged to extend beyond the boundary of the surface portion 2*c* and then angled, folded or bent to extend above the surface portion 2*c* or upper side of the protective layer 3. This embodiment can be seen in FIG. 8*b*. According to one embodiment the gripping device 5 is arranged at an arbitrary position on the protective layer 3.

Figure 2C:
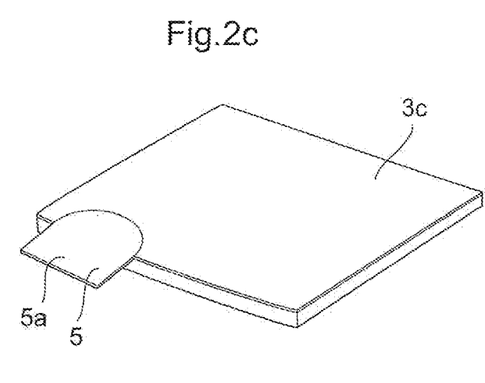
Figure 2D:
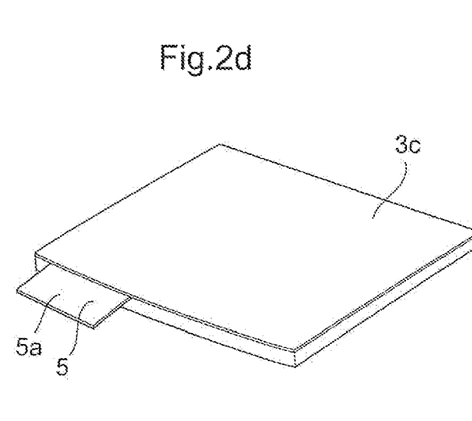
Figure 2E:
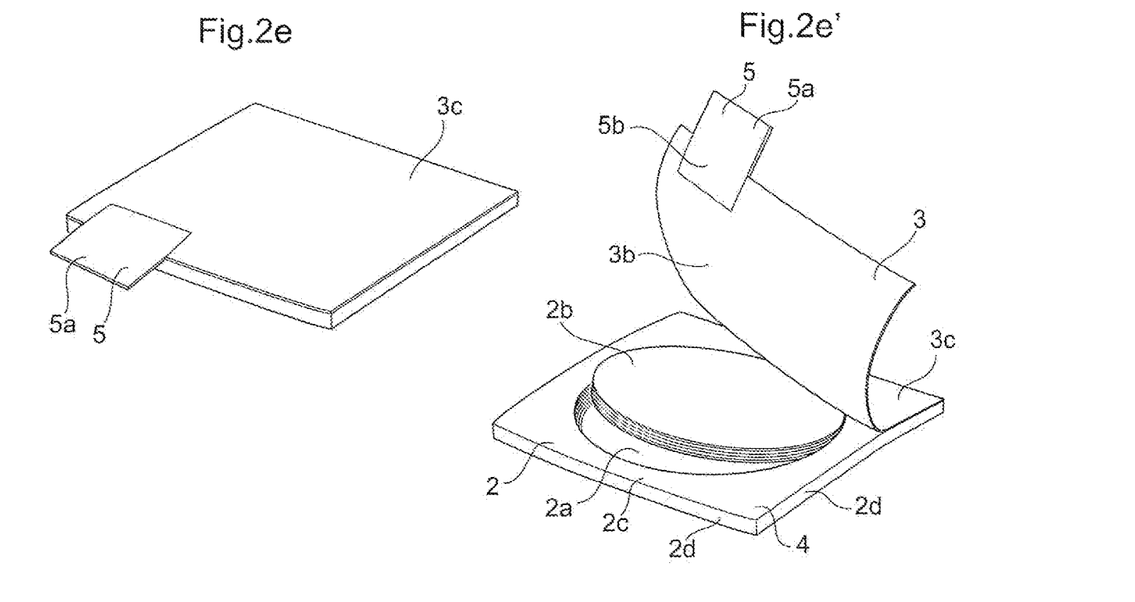
FIGS. 2e, 2e', 2f, 2f', show embodiments of the invention where the gripping device has a rectangular shape.
Figure 2F:
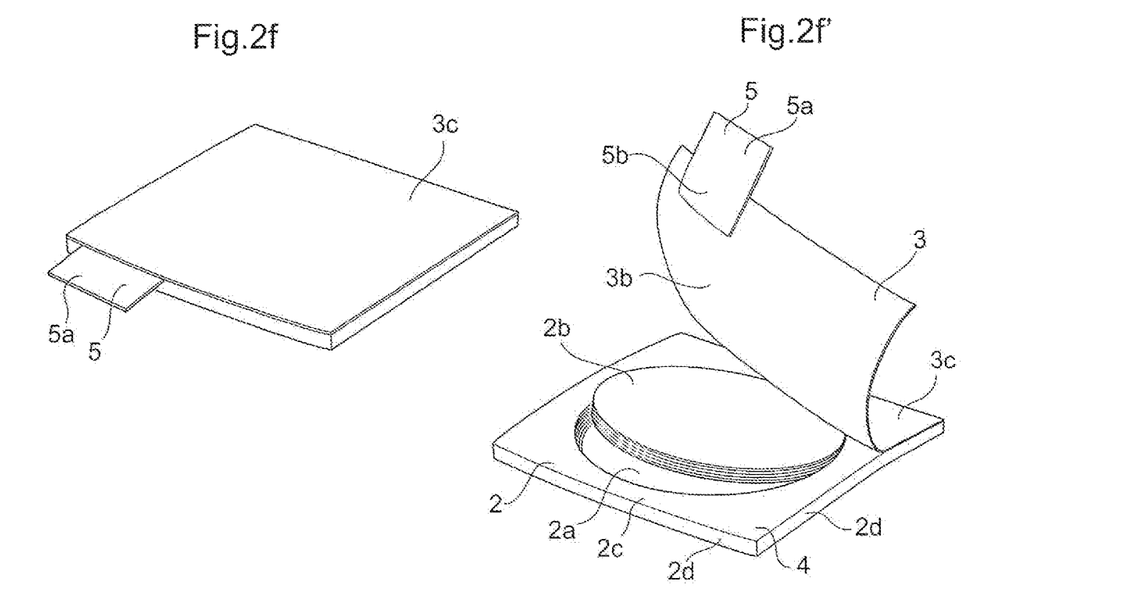
Figure 2G:
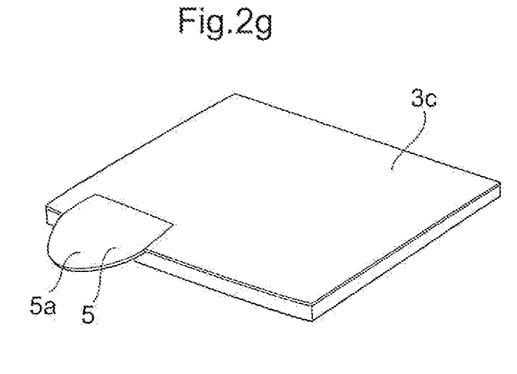
FIG. 2g, 2g', 2h, 2h', show embodiments of invention where the gripping device has a rounded shape in one end, and an angled shape in one end.
Figure 2H:
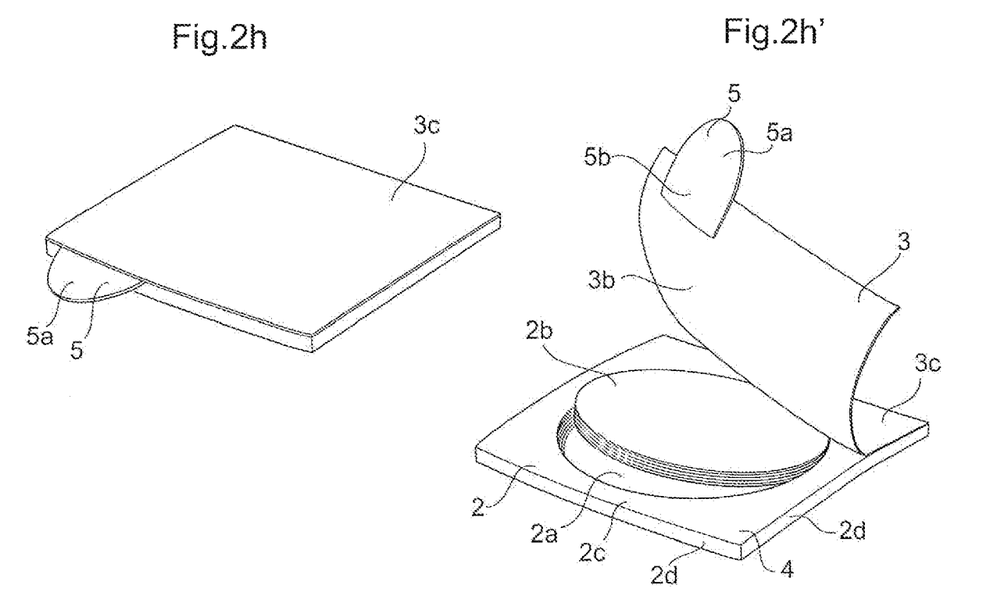

According to one embodiment as seen in FIG. 2*a*, 2*a'*, 2*b*, 2*b'* the gripping device 5 has a circular shape. According to one embodiment as seen in FIG. 2*c*, 2*c'*, 2*d*, 2*d'*, the gripping device 5 has a rounded shape in one end, and an angled shape in one end, wherein the gripping device 5 is attached at its rounded portion (s) via adhesive to the protective layer 3. According to one embodiment as seen in FIG. 2*e*, 2*e'*, 2*f*, 2*f'*, the gripping device 5 has a rectangular shape. According to one embodiment as seen in FIG. 2*g*, 2*g'*, 2*h*, 2*h'*, the gripping device 5 has a rounded shape in one end, and an angled shape in one end, wherein the gripping device 5 is attached at its angled portion(s) via adhesive to the protective layer 3. The embodiments described in FIGS. 2*a*, 2*a'*, 2*g*, 2*g'* may comprise similar material bridges as 5*d* described in FIG. 2*a"*, but may be comprised by two separate gripping devices 5 simply adhered to each other and a respective side of the protective layer 3. According to one embodiment, the gripping device 5 is made of a similar or the same material as the protective layer 3.

Figure 3:
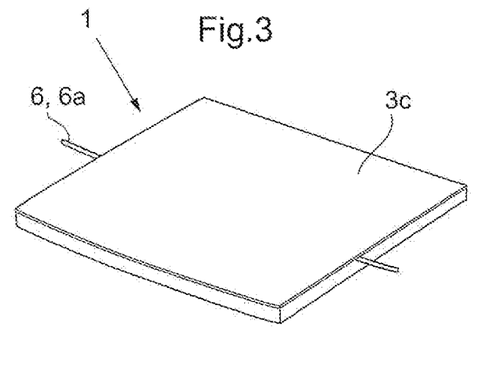
FIG. 3-3' shows perspective views of a device for surface sampling.

FIG. 3 shows a device 1 according to FIG. 1 except for the portion 3*a*. FIG. 3 further shows discloses a device 1 wherein a gripping device 6 is arranged between the protective layer 3 and the material layer 2 comprising a portion 6*a* extending beyond the boundary of the surface portion 2*c* for facilitating a removal of the protective layer 3 from the material layer 2. According to the embodiment of FIG. 3, the gripping device 6 is a thin thread. According to one embodiment, the thin thread is a comprised by a fishing line. According to one embodiment, the thin thread is comprised by nylon, polyvinylidene fluoride (PVDF, and called fluorocarbon), polyethylene, Dacron and Dyneema (UHMWPE). The most common type is monofilament, made of a single strand. FIG. 3' discloses the invention according to FIG. 3 wherein the interior of the device 1 and the thread 6 are shown.

Figure 4:
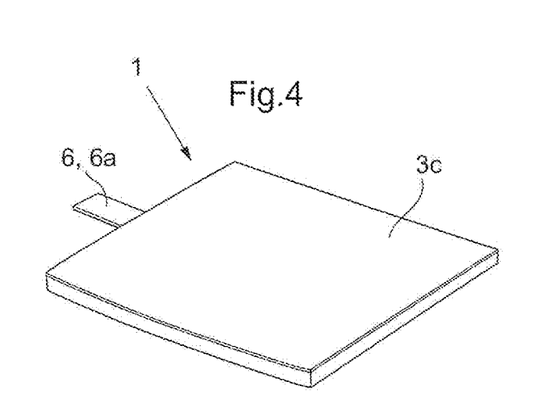
FIG. 4-4' shows perspective views of a device for surface sampling.

FIGS. 4-4' shows a device 1 for surface sampling according to FIG. 1 except for the portion 3*a*. FIG. 4 further discloses a device 1 wherein a gripping device 6 is arranged between the protective layer 3 and the material layer 2 comprising a portion 6*a* extending beyond the boundary of the surface portion 2*c* for facilitating a removal of the protective layer 3 from the material layer 2. According to the embodiment of FIG. 4, the gripping device 6 is a flat elongated sheet device comprising a silicone treated portion 6*a*, B. According to one embodiment, the entire gripping device 6 is silicon treated. Further, the gripping device 6 comprises a portion 6*b*, A, non-treated with silicon, wherein at least a portion of the silicon treated portion 6*a* extends beyond the boundary of the material 2. The non-treated portion of the gripping device 6 is attached to the filler device 2*b* of the material by the adhesive 4. Therefore when a user pulls the portion a of gripping device 6 the protective layer 3 will be removed to expose the adhesive 4 prior to attaching the device 1 for sampling, and at the same time remove the filler device 2*b* from the sampling volume 2*a*. Thus, no direct contact of a human to the filler or sampling volume 2*a* is needed during removal for the filler device 2*b* which reduces the risk of contaminating the sampling volume 2*a*. FIG. 4' discloses the invention according to FIG. 4 wherein the interior of the device 1 and the gripping device 6 are shown.

Figure 5:
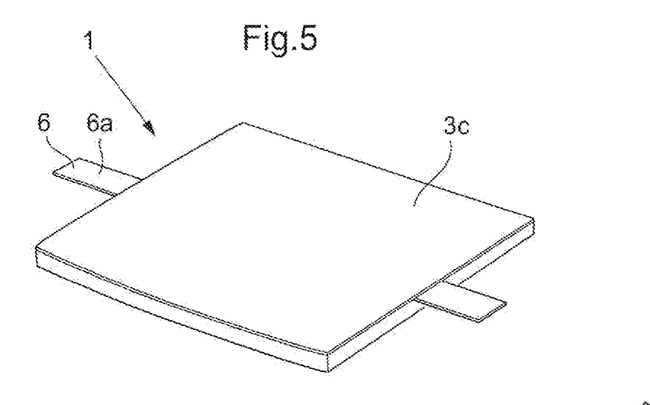
FIG. 5-5' shows perspective views of a device for surface sampling.

FIG. 5-5' discloses a similar device 1 as shown in FIG. 4-4', however this device 1 comprises an elongated gripping device 6 comprising two portions 6*a* extending beyond the boundary of the surface portion 2*c*, on a respective side of the device 1/surface portion 2*c*, i.e. on two sides of the device 1/surface portion 2*c* or, in the case of a rounded or circular device 1, at two positions of the device 1/surface portion 2*c*. According to FIG. 5', the gripping device 6 comprises a central portion 6*b* attached to the filler device 2*b* of the material by the adhesive 4. FIG. 5' discloses the invention according to FIG. 5 wherein the interior of the device 1 and the gripping device 6 are shown.

Figure 6:
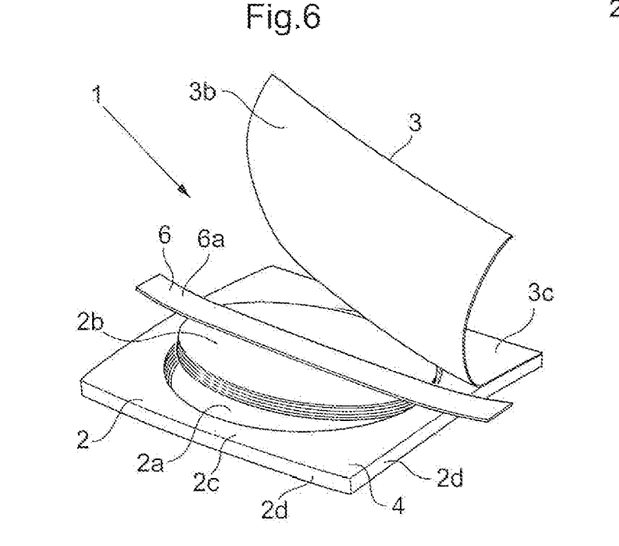
FIG. 6 shows a perspective view of a device for surface sampling.

FIG. 6 shows a device 1 similar to that of FIG. 5, wherein the gripping entire gripping device 6 is silicone treated. The embodiment of FIG. 6 would have the similar appearance as FIG. 5 in a closed state, i.e. not showing the interior of the device 1.

According to one embodiment, the gripping device 6 is made of a similar or the same material as the protective layer 3.

Using the device 1 for surface sampling, may be carried out according to the following steps. A user looks for a suitable surface on which the test can be made. The surface can for instance be horizontal, vertical, slanted or somewhat concave. The user removes the protective layer 3 by grasping the portion 3*a* or the gripping device 5, 6 and pulling it off the material layer 2. According to one embodiment, the filler device 2*b* is thereby automatically removed from the sampling volume 2*a*. In other embodiments, the filler device 2*b* is removed by hand/manually. The device 1 is thereafter pressed with the exposed surface portion 2*c* having adhesive 4 onto a selected test surface. The device 1 is fixed on the surface by firmly pressing with the finger tips onto the device 1. A syringe (now shown) is thereafter filled with approx. 1-2 ml of washing/extracting liquid determined by the final analysis that is to be performed. The washing/extracting liquid is thereafter injected into the sampling volume 2*a* by piercing the syringe needle through the body of the device 1 into the sampling volume 2*a* of the device 1 and injecting the content of the syringe. If necessary, the needle can be bent to get a convenient angle. Thereafter, a part of the liquid and is sucked out from the sampling volume 2*a* and reintroduced into the sampling volume 2*a* while maintaining the needle inserted. This will produce turbulence which improves the dissolution of the contaminants, particles and substances. This may repeated a number of times or alternatively, the device 1 may be carefully rubbed especially when the sample is bound in a thick layer of contaminants. Finally, the as much as possible of the content in the sampling volume 2a is sucked out and retrieved and transferred to a cylinder (not shown) for further analysis. For even higher accuracy, the injection and turbulence creation parts may be carried out repeatedly.

Figure 9:
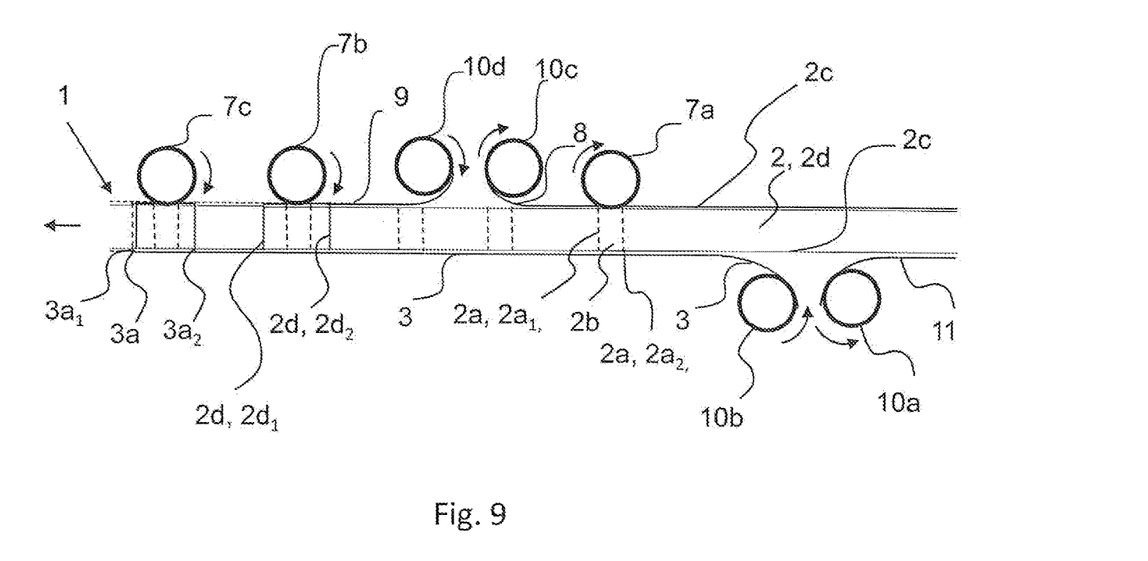
FIG. 9 shows a method of manufacturing a device for surface sampling.

FIG. 9 shows a method of manufacturing the device 1. According to one embodiment, the method is carried out by a feeding elongated variants of the components, i.e. parts 2, 3, 9, of the device 1 to be formed into the device 1, but also part 8, and use rolls 10a, 10b, 10c, 10d for applying and/or removing at least some of the parts, 3, 8, 9, thus forming different layers, and use punches 7a, 7b, 7c, e.g. a first punch 7a, a second or further or edge portion forming punch 7b, and a third or yet another or further punch 7c for punching through the parts, 2, 3, 8, 9, in a manner wherein the device 1 is formed. In FIG. 9, the parts 2, 3, 9 to be formed into the device 1 is heavily enlarged in relation to the rolls and punches to better explain the method/process.

In FIG. 9, an elongated material layer 2 or elongated variant of the material layer 2 is fed in a left direction as seen in FIG. 9. According to one embodiment, a liner in the form of a protective sheet 8 is arranged along the elongated material layer 2, wherein an adhesive layer is present between the material layer 2 and the protective sheet 8. An arrow shows the feeding direction as well as the direction of rotation of the rolls and punches. According to one embodiment, feeding is carried out by using a conveyor belt (not shown). According to one embodiment, feeding and punching is carried out by the aid of opposing punches to the one disclosed in FIG. 9 (not shown). According to one embodiment, the method further comprises removing liner 11 by using a first roll 10a configured to remove a liner 11, wherein the surface portion 2c of the material layer 2 and an adhesive layer thereon is exposed. According to one embodiment, the method further comprises applying a protective layer 3 onto the adhesive layer using a second roll 10b on the side of the material layer opposite the protective sheet 8, i.e. on the side where the liner 11 has been removed. According to one embodiment, the method further comprises forming the cut-out of the material 2, i.e. forming the sampling volume 2a and the filler device 2b, by punching through the material layer 2, and potentially through the protective sheet 8 if present, however not through any additional layer such as any applied protective layer 3, i.e. the protective layer remains un-punched. Punching is carried out using a punch 7a forming punching lines or cuts $2a_1$, $2a_2$. The limited tolerances allowed puts a high requirement in terms of exactness in the forming of the punch and punching portions thereon as well as entire process arrangement. According to one embodiment, the method further comprises removing the protective sheet 8 using a roll 10c. According to one embodiment, the protective sheet 8 remains on the adhesive layer/material layer 2 at portions covering the sampling volume 2a. According to one embodiment, the method further comprises applying a latex sheet or thin elastomer film 9 on the same side of the material layer 2 at which the protective sheet 9 was removed. The remaining protective sheet 8 thus prevents a direct contact between the latex sheet or thin elastomer film and the adhesive layer which enables the removing of the filler device 2b from the sampling volume 2a. According to one embodiment, the method further comprises forming a circumferential edge portion 2d of the material layer by punching through the latex sheet or thin elastomer film and the material layer 2 using a second or further punch 7b, thus forming punching lines or cuts $2d_1$ and $2d_2$, In this step, punching is not carried out through the protective layer 3. Hence the protective layer 3 remains un-punched. The fact that only a part of the layers are cut and thus the limited tolerances thereby allowed puts a high requirement in terms of exactness in the forming of the punch and punching portions thereon as well as entire process arrangement. This is especially true since the punch 7b punches through different materials having different characteristics. Of particular difficulty is to punch through the thin and sensitive latex sheet or elastomer film which requires a sharp punching portion, further through the material layer, and which at the same time does not punch through the protective layer 3 in this step. According to one embodiment, a further roll 10e (not shown) is arranged between punches 7b and 7c, for removing any spill or waste between the forming devices 1 and to facilitate a next punching step wherein the portion 3a is formed. The removed waste is shown by the dotted line in FIG. 9. According to one embodiment, the waste between the forming devices 1 is left between the forming devices 1. According to one embodiment, the method further comprises forming a portion 3a of the protective layer by punching through the protective layer 3 using a yet a further punch 7c, forming at least punching line or cut $3a_1$ whereby the punching, or at least a part of the punching when only the portion 3a extends beyond the boundary of the surface portion or extending from the circumferential edge portion 2d, is carried out outside the circumferential edge portion 2d previously formed. According to one embodiment, outside in relation to another portion or punching line is defined as further away from a central portion of the device 1 to be shaped. According to one embodiment, outside in relation to another portion or punching line is defined as further away from a position or central line arranged at a center between the punching lines $2d_1$ and $2d_2$. According to one embodiment, punching is carried out outside at least a portion of the circumferential edge portion 2d, e.g. if the device 1 is to be shaped as a circle, or at least outside a portion of one edge portion 2d if the device 1 is to be shaped in a rectangular or square. According to one embodiment, a punching line or cut $3a_2$ is formed essentially through the existing punching line $2d_2$ or at least in a close proximity to this punching line. According to one embodiment, forming the portion 3a is carried out by punching through latex sheet or thin elastomer film 9, the material layer 2 in addition to the protective layer 3 as described above.

According to one embodiment, the parts 2, 3, 9 to be formed into the device 1 as well as part 8, has a width opposite the feeding direction which corresponds to the width of the device 1. According to one embodiment, the parts 2, 3, 9 to be formed into the device 1 has a width opposite the feeding direction which is larger than the width of the device 1. The punches 7a, 7b, 7c may thus have various shapes and be configured to punch in either a lengthwise feeding direction or a direction perpendicular to the feeding direction or both. According to one embodiment, the punches 7a, 7b, 7c are rotary punches. According to one embodiment, the feeding is carried out in a continuous manner, i.e. at a continuous speed. According to one embodiment, the punches 7a, 7b, 7c, are flat punches. In the latter case, the feeding of the parts 2, 3, 8, 9 may be carried out in a stepwise manner. The punch 7c may also be configured to shape the portion 3a e.g. as seen in 1, 1'. The punch 7c may also be configured to shape the portion 3a such that the portion 3a extends outside the boundary 2d along the entire side of the device 1 or at least along a part of the side or along one of several sides. According to one embodiment, the punching carried out by the punch 7c extends through the latex sheet or thin elastomer film 8 and the material layer 2 outside either side of or at least outside at least two sides of the punch forming the sampling volume 2a. According to one embodiment, forming the portion 3a using the further punch 7c, is carried out by defining the distance between at least two opposite sides of the punches $3a_1$ and $3a_2$ to be greater than the distance between the punching lines $2d_1$ and $2d_2$. According to one embodiment, the distance between at least two opposite sides of the punches $3a_1$ and $3a_2$ is greater than the distance between the punches $2d_1$ and $2d_2$ at least where the portion 3a is formed. Hereby, the method produces a portion 3a irrespective of the exact placement of the punches in relation to each other and the parts 2, 3, 8, 9. The method/process allows a slight displacement, offset either to the right or left in FIG. 9, i.e. forwards or backwards in relation to the direction of feeding with regards to the previously formed punching lines $2d_1$ or $2d_2$. The displacement, may be offset in a direction perpendicular to the feeding direction as well. If a punching by punch 7c occurs offset slightly to the right, some waste in the form of material layer is formed to the right of $2d_2$, as well as potentially a further portion 3a extending beyond the boundary of the surface portion 2c which can be used to facilitate removal of the protective layer. On the left side of punching line $2d_1$ the length of the portion 3a, i.e. the larger width between $3a_1$ and $3a_2$ to be greater than the distance between the punches $2d_1$ and $2d_2$ ensures this. If, on the other hand, a punching by punch 7c occurs offset slightly to the left the effect is simply that a slightly larger portion 3a is formed, i.e. that this portion 3a extends beyond the boundary of the surface portion 2c or the circumferential portion than would otherwise have been the case. According to one embodiment, the punch 7c is configured, e.g. by the shape of punching portions, to form portions 3a at opposite sides of a side of the device 1 for every other, or any other sequence, device 1 being formed. Every second device 1 formed will thus be similar and mirrored in relation to the previous. According to one embodiment, a facilitated packaging, e.g. comprising a more equally distributed arranging of the shape and weight of the devices 1 is enabled in a subsequent packaging step. According to one embodiment, the packaging into, as well as a subsequent removal of the devices from, into small plastic bags are facilitated. A plurality of devices 1 may, due to the possibility for mirrored versions of the devices 1, be arranged with their protective layers, i.e. of considerably lower friction than the latex sheet or elastomer film, pointing outwards, towards the side of the plastic bag. The devices 1 can be arranged inside the bag in various constellations, however preferably two prerequisites are fulfilled, the outermost devices 1 have their low friction sides pointing outwards towards the side of the bag, and the devices 1 are arranged so that their portions 3a are aligned with each other. Preferably, the portions 3a are facing the bottom of the bags where they are not in the way of an operators fingers when gripping for a device 1 inside the bag, which could influence the portion 3a and an unwanted removal of the protective layer 3. Arranging the portions 3a aligned to each other further increase the overall ability of the plurality of devices to withstand unwanted influence on e.g. the exposed portion 3a of a single device and not having its portion 3a aligned with the other portions 3a.

Thus, by using the above mentioned method/process, the forming of a device 1 which is configured for being fixed to a test surface, and for allowing washing/extracting liquid to be injected and extracted from the device while being fixed to the test surface wherein removal of the protective layer from the material layer at the same time as the risk of contamination is reduced in a cost efficient way, is enabled. The punching using punch 7c, i.e. the forming of the protective layer 3 and the portion 3a is carried out in one step, after the arranging of the protective layer (as well as the latex sheet or elastomer film), whereby no unwanted particles etc can enter the sampling volume or otherwise contaminate the device 1. According to one embodiment, the use of portions 3a prevent the formed devices 1 from unwanted adhering to each other or the packaging material while being transported. This further facilitates the use of the device 1, particularly relevant in difficult and/or dangerous environments.

A preferred embodiment of a device and method for manufacturing such device for surface sampling according to the invention has been described. However, the person skilled in the art realizes that this can be varied within the scope of the appended claims without departing from the inventive idea.

All the described alternative embodiments above or parts of an embodiment can be freely combined without departing from the inventive idea as long as the combination is not contradictory.

The invention claimed is:

1. A method of manufacturing a device for surface sampling, the device comprising:
   a flat material layer comprising a surface portion and a circumferential edge portion defining the boundary of the surface portion, further comprising a sampling volume, wherein the sampling volume is adapted to comprise a filler device for filling out the sampling volume,
   a protective layer arranged on the surface portion of the material layer by an adhesive arranged on the material layer,
   wherein a portion of the protective layer extends beyond the boundary of the surface portion for facilitating a removal of the protective layer from the material layer,
   the method comprising:
      feeding an elongated material layer, and a protective layer and latex sheet or thin elastomer film arranged on a respective side of the material layer,
      forming a circumferential edge portion of the of the material layer by punching through the latex sheet or thin elastomer film and the material layer using a punch for forming a circumferential edge portion of the material layer,
      forming a portion of the protective layer by punching through the protective layer using a further punch for forming a portion, whereby the punching, or at least part of the punching, is carried out outside the circumferential edge portion.

2. The method according to claim 1, whereby forming of the sampling volume is carried out using a first punch and adding a latex sheet or thin elastomer film is carried out before using the punch for forming the circumferential edge portion.

3. The method according to claim 1, wherein the punching using the punch for forming the circumferential edge portion, forms at least punching lines having a first distance there between, and wherein the punching using punch for forming the portion, forms at least punching lines having a second distance there between, wherein the second distance is larger than the first distance at least where the portion is formed.

4. The method according to claim 1 wherein forming the portion is carried out by punching through latex sheet or thin elastomer film, the material layer in addition to the protective layer.

5. The method according to claim 1, wherein the device is configured for being fixed to a test surface, and for allowing washing/extracting liquid to be injected and extracted from the device while being fixed to the test surface.

\* \* \* \* \*